March 12, 1963     O. E. E. STROMBERG     3,080,949
SURGE BRAKE OPERATING MECHANISM FOR TRAILERS AND THE LIKE
Filed May 11, 1959     3 Sheets-Sheet 1
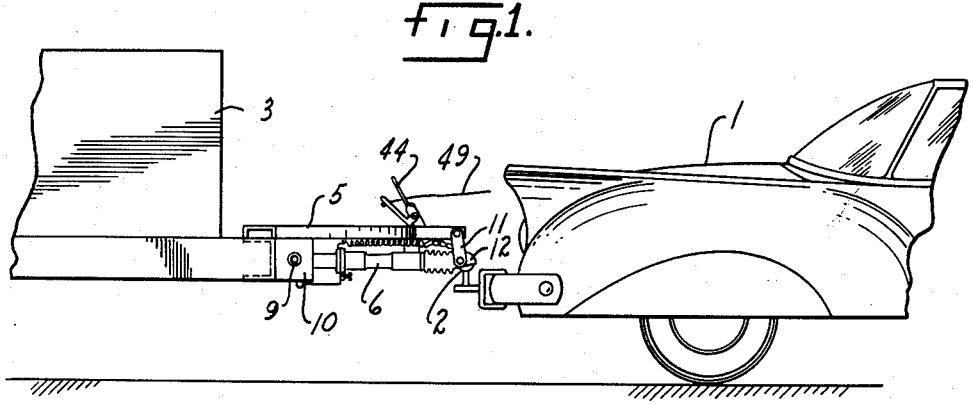
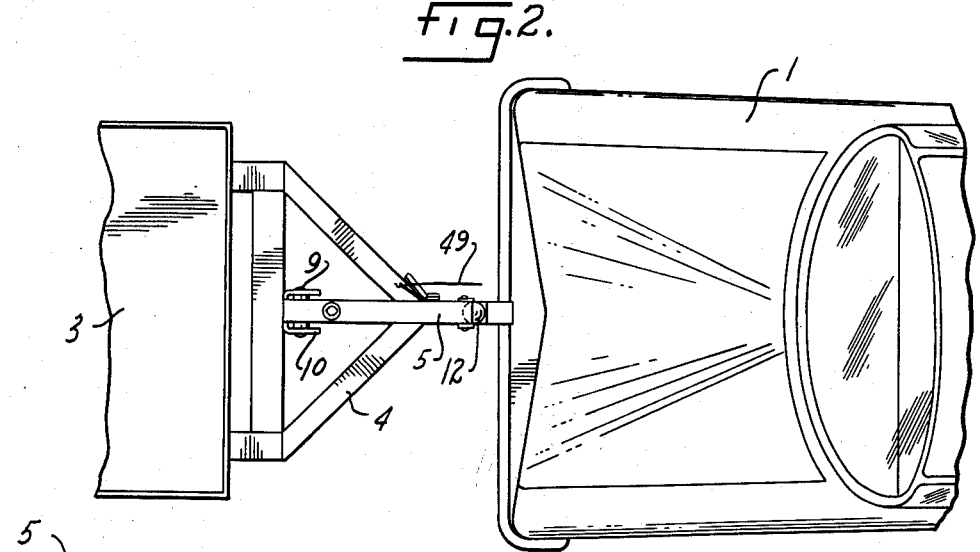
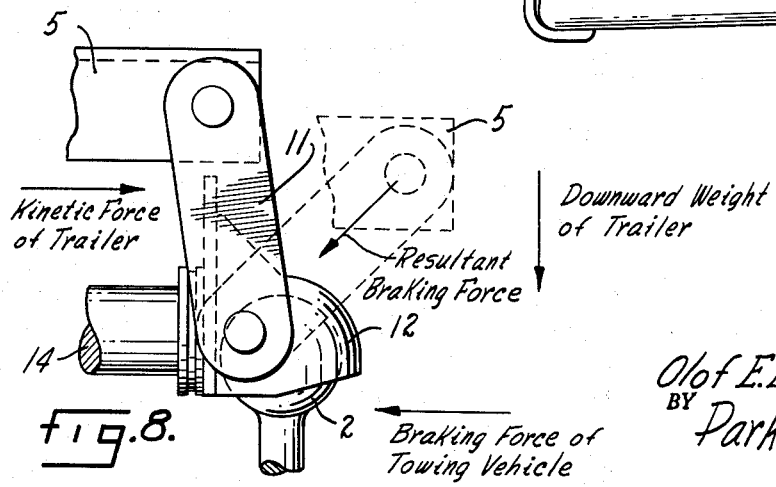
INVENTOR.
Olof E. E. Stromberg,
BY Parker & Carter
Attorneys.

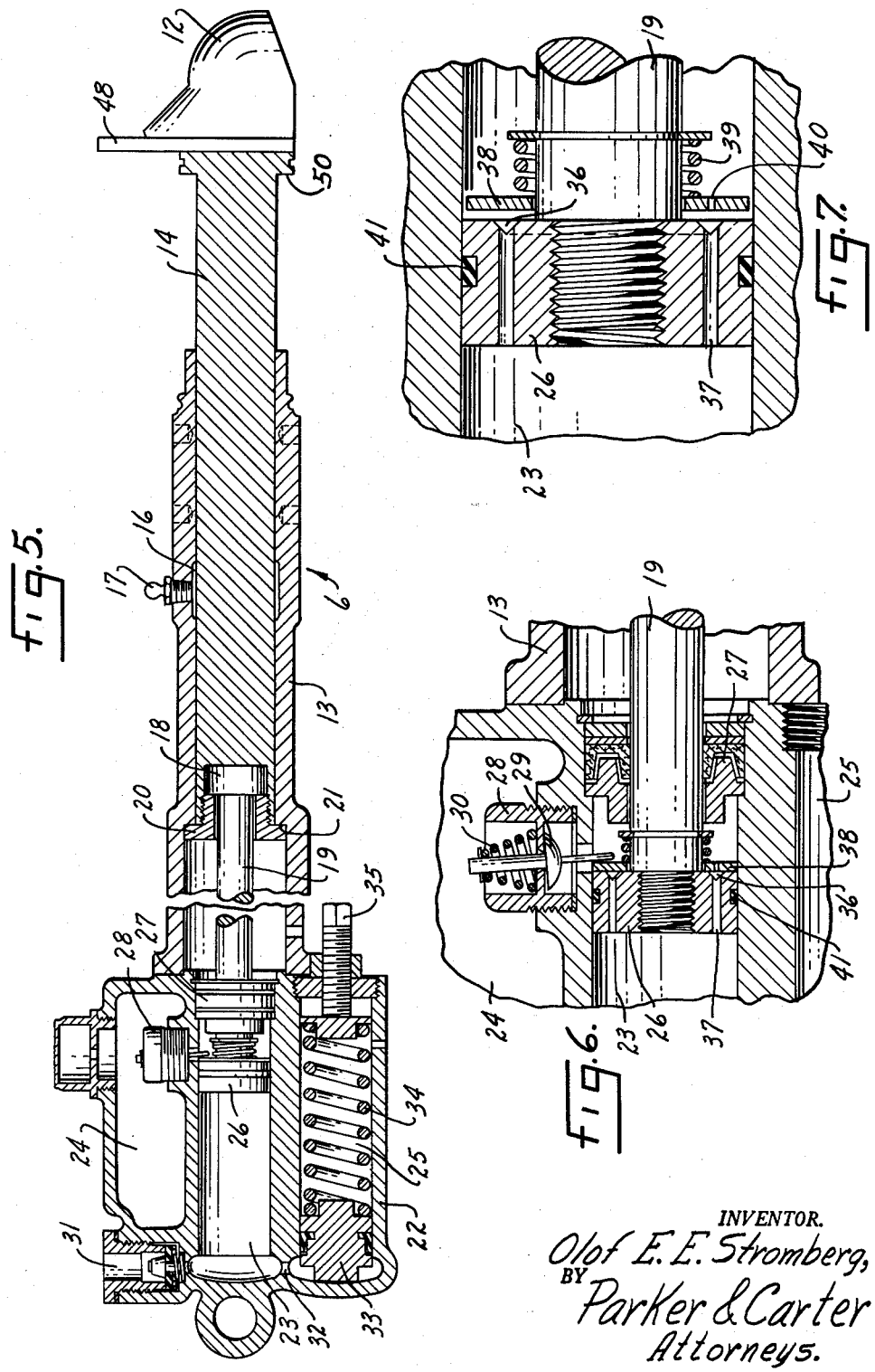

United States Patent Office 3,080,949
Patented Mar. 12, 1963

3,080,949
SURGE BRAKE OPERATING MECHANISM FOR TRAILERS AND THE LIKE
Olof E. E. Stromberg, 5453 Northwest Highway, Chicago, Ill.
Filed May 11, 1959, Ser. No. 812,157
4 Claims. (Cl. 188—112)

My invention relates to improvements in surge brake operating mechanism for trailers and the like wherein the inertia of the trailer will, upon application of the tractor brakes cause brakes to be applied on the trailer.

Another object is to provide a mechanism wherein the brake pressure will also be increased as a result of the downward tilting of the front of the trailer as the brakes are applied.

Another object is to provide a surge brake assembly which is simple, foolproof and easily installed and which may be installed on many types of tractor-trailer combinations.

Another object is to provide automatic means whereby brakes on the trailer are automatically applied in the event that trailer and tractor become accidentally disconnected.

Other objects will appear from time to time throughout the specification and claims.

The invention is illustrated more or less diagrammatically in the accompanying drawings, wherein:

FIGURE 1 is a side elevation of tractor and trailer showing the surge brake actuator in place;

FIGURE 2 is a plan view of FIGURE 1;

FIGURE 5 is a longitudinal section on an enlarged scale of FIGURE 3;

FIGURE 6 is a detail section on an enlarged scale of the piston shown in FIGURE 5 in towing position;

FIGURE 7 is a detail section on an enlarged scale similar to FIGURE 6 showing the parts in the brake applying position;

FIGURE 8 is an enlarged view of a detail of my invention.

Like parts are indicated by like characters throughout the specification and drawings.

Figure 3:
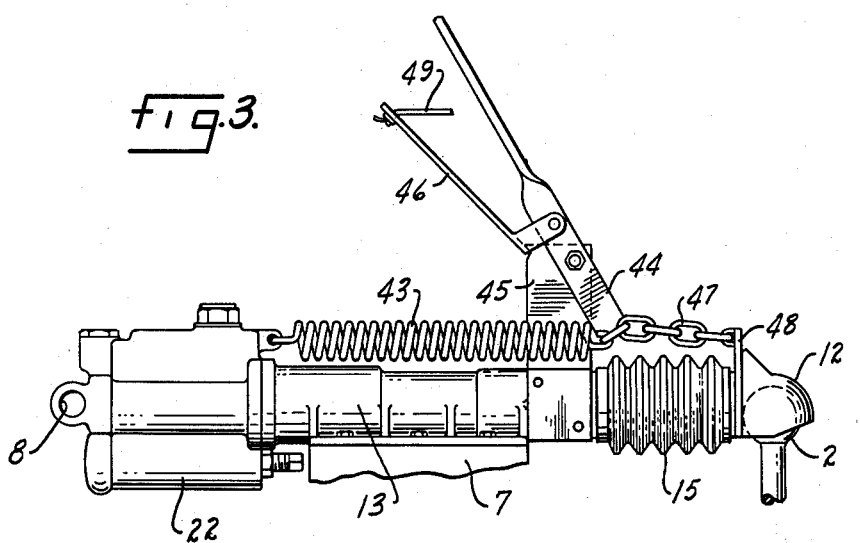
FIGURE 3 is a side elevation on a larger scale of the surge brake actuator.

The tractor 1 carries the coupling ball 2. The trailer 3 has the forwardly projecting A-frame 4 and channel or wagon tongue 5 to which the actuator 6 is attached by the mounting pad 7 as in FIGURE 3, or may, as in FIGURES 1, 2 and 4 be supported at its rear end by eyelet 8 and pin 9 from the yoke 10 on channel 5 and at its front end by the link 11 pivoted on the channel 5 at top and on the ball socket 12 at bottom. The ball socket 12 in each case engages the ball 2.

The actuator includes a draw bar guide sleeve 13, a draw bar 14 slidable in, guided thereby and projecting forwardly therefrom to terminate in the ball socket 12. The flexible expansible bellows 15 anchored at one end on the forward end of the sleeve 13 and at the other end on the flange 50 on the forward end of the draw bar 14 encloses the outboard end of the bar. The grease pocket 16 and grease fitting 17 lubricate the draw bar 14.

The inboard end of draw bar 14 is pocketed to contain the head 18 of piston rod 19, held in place by the flanged threaded sleeve 20 which in the towing position abuts on the shoulder 21 in the guide sleeve 13.

The rear end of the sleeve 13 is closed by the master cylinder assembly 22 which includes the actuating cylinder 23, the reservoir 24 and the cushion cylinder 25.

A piston 26 is carried on the inboard end of the piston rod 19 and reciprocates in the actuating cylinder 23. A packing assembly 27 closes the outboard end of the actuating cylinder 23. Reservoir 24 is connected to the actuating cylinder 23 through the valve sleeve 28 closed by the wobble valve 29 which in the towing position is held open as indicated in FIGURE 6, and which when the piston moves to the left in FIGURE 5 to apply the brakes is closed by the spring 30. The actuating cylinder 23 is connected through duct 31 to the usual type of hydraulic brake system on the trailer. The cushion cylinder 25 is connected by passage 32 to the actuating cylinder 23 so that when pressure in 23 exceeds a predetermined point, the cushion piston 33 may move to the right compressing the spring 34. The tension in the spring may be adjusted by the screw 35.

Referring to FIGURE 6, the piston 26 has on its face toward the piston rod an annular groove 36 extending about its entire periphery. This annular groove is connected to a plurality of radially disposed axial fluid passages 37 extending clear through the piston. The groove 36 is closed by the washer check valve 38 seated by the spring 39. When the piston rod 19 moves to the left, carrying the piston 26 with it, oil in the left hand end of the cylinder 23 flows freely through the ducts 37 unseating the valve 38 to flow into the right hand end of the cylinder 23 but since the right hand end of the cylinder contains the piston rod 19, its capacity is less than the capacity of the left hand end so pressure builds up in the brake system up to a point at which the brakes having been applied, the pressure is limited by movement of the piston 33.

In the reverse operation, as the piston 26 moves to the right, the valve 38 instead of being unseated as in FIGURE 7, is seated as in FIGURE 6 and fluid may return to the left hand end of the cylinder 23 only at reduced speed through the weephole 40. Thus, providing a shock absorber effect to control movement of the piston. The piston is sealed by an O-ring 41.

When the tractor is towing the trailer, the parts are in the position shown in FIGURES 5 and 6, and there is no pressure on the trailer brakes. When brakes are applied on the tractor and the tractor slows down, the inertia of the trailer causes the trailer to override the tractor. At this time, the draw bar 14 moves to the left with respect to guide member 13 in FIGURE 5, generates a pressure in the master cylinder which represents the difference in capacity between the left and right hand ends of the actuating cylinder 23. The greater the inertia of the trailer, the greater the pressure built up in the brake system up to he point at which the cushion piston 33 moves to the right in FIGURE 5.

As the tractor begins to pick up the load and tow the trailer, the draw bar 14 moves to the right with respect to guide member 13, forcing oil to flow backwardly through the now seated valve disc 38 through the weephole 40, thus providing a shock absorber effect built into the actuating cylinder.

Under some circumstances, it is desired to get a greater line pressure than can be obtained by the mere inertia of a tractor. The mechanism shown in FIGURES 4 and 8 make this possible by taking advantage of the tendency of the forward end of the tractor to nose down when the brakes are applied.

Figure 4:
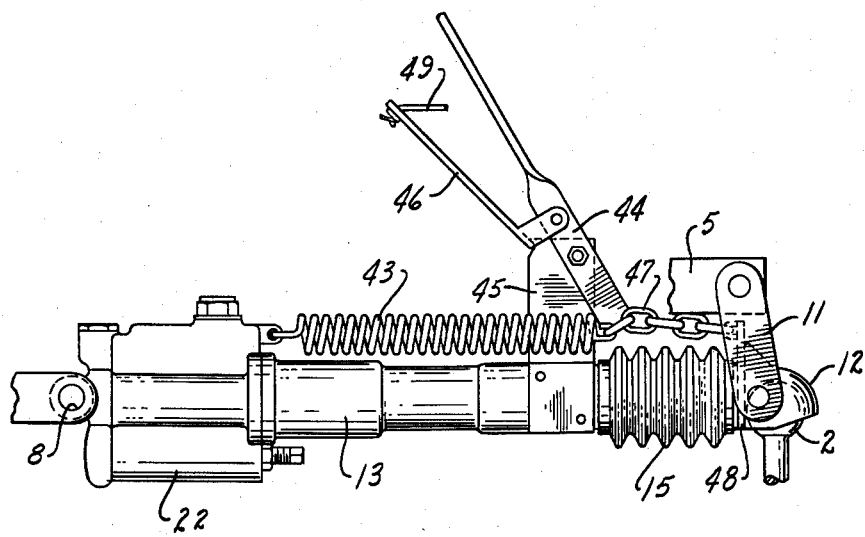
FIGURE 4 is a view similar to FIGURE 3 showing a modified mounting of the actuator.

In the device of FIGURE 3, only a straight line application of the inertia of the trailer is available. In the device of FIGURES 1, 4 and 8, it will be noted with special reference to FIGURE 8 that as the trailer tends to override the tractor the kinetic force of the trailer causes the channel 5 to move forwardly rotating the link 11 in clockwise direction from the position shown in full lines to the position shown in dotted lines. As the link approaches the forty-five degree position of the dotted lines, the downward weight of the trailer as it noses down provides by toggle action additional force to move the draw bar 14 to the rear. Under these circumstances, the line pressure built up in the actuating cylinder is a result both of the direct straight line kinetic energy of the trailer riding upon the tractor and also of the increased downward nose pressure resulting from the application of the brakes on the trailer. No other connection is needed between the tractor and the trailer than the ball 2 and the ball socket 12 for ordinary operation. But when the tractor and trailer are disconnected either intentionally or accidentally, something more is needed and that takes the form of a tension spring 43 anchored on the master cylinder assembly 22 at one end and on the brake lever 44 at the other end. The lever 44 is carried by a plate 45 bolted to the guide sleeve 13 and is provided with a latch release lever 46. This latch lever holds the spring under tension as shown in FIGURES 3 and 4. If the latch lever 46 is released by rotating it in clockwise direction, then the spring 43 will rotate the brake lever 44 in clockwise direction, exerting a tension on the linkage 47, the link on the plate 48 and the spring 43 will then move the draw bar to the left to apply the brakes. This may be done by hand or if tension is applied to the rope 49 extending from the lever 46 to the tractor because the tractor and trailer have actually become disconnected, this latch will be automatically released to apply the brakes. The rope will be of such strength that if disconnection occurs, it will break.

Once the brake has been applied on the trailer, either by manual release of the latch 46 or by tension on the cord 49 resulting from separation of tractor and trailer, the brakes remain applied until the operator releases them by manipulation of the lever 44.

The shock absorber cushion effect controls and retards movement of the piston. This gradual movement of the piston results in a gradual release of the brakes and eliminates the reciprocatory vibration known as "hunting" which does occur when the brakes are suddenly released by sudden retrograde piston movement.

The flange 50 on the draw bar positively limits the rearward movement of the draw bar 14 when the flange engages the forward end of the sleeve guide 13. Thus no matter what pressure is applied to move the draw bar to the left in FIGURE 5, no further increase in line brake fluid pressure can occur.

Under ordinary service conditions, the flange 50 will never touch the guide sleeve 13 but when reversing, this will occur and it is important that on reversing, the line pressure be held below a predetermined limit.

This, in combination with the pressure limitation of the cushion cylinder, makes it possible to operate the system without any other means for relieving the pressure in the brake system and makes it possible to dispense with the pressure relief valves which have hitherto been used.

Upon reversing, when the flange 50 has contacted the end of the sleeve 13, the tractor may reverse the trailer without further increase in line pressure no matter what type of brake is used. Preferably with this system, however, the so-called uno-servo brake is used, a type of brake wherein on forward movement, the shoes seat with maximum pressure as a result of the servo effect. On rearward movement, their braking effect is greatly reduced because they seat with lesser pressure, the servo effect being felt only on forward and not on rearward movement. Typical examples of this well known type of brake system are shown in patents United States Nos. 2,152,017 and 2,562,280.

I claim:

1. A surge brake actuator especially adapted for use with a uno-servo brake system on a trailer, said actuator including, in combination, a drawbar and means for connecting it to a tractor,
said drawbar being effectively connected to a brake actuating piston in a master cylinder,
said master cylinder having an outlet therefrom connectable to said trailer brake system,
means for connecting the master cylinder to a trailer,
a cushion cylinder having a cushion piston therein in communication with the master cylinder between the brake actuating piston and said outlet, said cushion cylinder being in continuous communication with the master cylinder solely through port means located between said outlet and brake actuating piston in all relative positions of the brake actuating piston in the master cylinder, and biasing means urging the cushion piston against the pressure in the master cylinder,
said cushion piston being expandable against the biasing means in response to a predetermined pressure in the master cylinder to thereby limit the maximum pressure in the master cylinder,
fluid connection means between the ends of the master cylinder which enables fluid to flow from one end to the other end of the master cylinder when the piston moves in a trailer brake applying direction,
the rate of increase of the volume behind the piston being less than the rate of decrease of volume ahead of the piston for each increment of movement of the piston in a trailer brake applying direction by virtue of the extension of the drawbar into the volume behind the piston,
said fluid connection means enabling the pressure in the master and cushion cylinders to be quickly increased as the piston moves in a brake applying direction, and
means for less quickly decreasing the pressure in the master and cushion cylinders as the piston moves in a brake releasing direction to thereby cushion the movement of the piston.

2. The surge brake actuator of claim 1 further characterized in that the fluid connection means comprises at least one passage which enables fluid to flow freely from one end to the other end of the master cylinder when the piston moves in a trailer brake applying direction, and the means for less quickly decreasing the pressure in the master and cushion cylinders is a fluid flow restrictor co-operable with the passage only when the brake actuating piston moves in a brake releasing direction.

3. The surge brake actuator of claim 2 further characterized in that the passage forming the fluid connection means extends through the brake actuating piston, and the means for less quickly decreasing the pressure in the master and cushion cylinders is a flap valve movable with and lightly spring biased into engagement with the brake actuating piston on the drawbar side thereof so as to abut the brake piston when it moves in a brake releasing direction, and to be retracted therefrom, and thereby to offer no resistance to fluid flow therethrough, when the brake piston moves in a brake applying direction,
said flap valve having an opening therein which is smaller than said passage, said opening being in fluid communication with the passage in the brake piston.

4. A surge brake actuator especially adapted for use with a uno-servo brake system, said actuator including, in combination,
a drawbar and means for connecting it to a tractor,
an actuating piston in a master cylinder,
said master cylinder having an outlet therefrom connectable to a trailer brake system,
means for pivotally connecting the master cylinder to a trailer,
a rigid extension from the trailer,
a generally perpendicularly positioned link pivotally connected at its upper end to the rigid extension and at its lower end to the drawbar to thereby enable the trailer to override the tractor an amount equal to the horizontal component of the swing of the link, a cushion cylinder having a cushion piston therein in communication with the master cylinder between the brake actuating piston and said outlet, said cushion cylinder being in continuous communication with the master cylinder solely through port means located between said outlet and brake actuating piston in all relative positions of the brake actuating piston in the master cylinder, and biasing means urging the cushion piston against the pressure in the master cylinder, fluid connection means between the ends of the master cylinder which enables fluid to flow from one end to the other end of the master cylinder when the piston moves in a trailer brake applying direction, the rate of increase of the volume behind the piston being less than the rate of decrease of volume ahead of the piston for each increment of movement of the piston in a trailer brake applying direction by virtue of the extension of the drawbar into the volume behind the piston, said fluid connection means enabling the pressure in the master and cushion cylinders to be quickly increased as the piston moves in a brake applying direction, and means for less quickly decreasing the pressure in the master and cushion cylinders as the piston moves in a brake releasing direction to thereby cushion the movement of the piston.

References Cited in the file of this patent
UNITED STATES PATENTS

| | | |
|---|---|---|
| 1,774,022 | Leuzinger | Aug. 26, 1930 |
| 2,003,010 | Nixon | May 28, 1935 |
| 2,179,241 | Groves | Nov. 7, 1939 |
| 2,275,700 | Swift | Mar. 10, 1942 |
| 2,371,705 | O'Connor | Mar. 20, 1945 |
| 2,391,603 | Wagner | Dec. 25, 1945 |
| 2,407,156 | Horne | Sept. 3, 1946 |
| 2,571,323 | Yoder | Oct. 16, 1951 |
| 2,633,942 | Barnes | Apr. 7, 1953 |
| 2,637,977 | Seppman | May 12, 1953 |
| 2,642,961 | Teal | June 23, 1953 |
| 2,662,616 | DeLateur | Dec. 15, 1953 |
| 2,666,294 | Porter | Jan. 19, 1954 |
| 2,716,471 | Long | Aug. 30, 1955 |
| 2,741,896 | Geiger | Apr. 17, 1956 |
| 2,746,574 | Smith et al. | May 22, 1956 |
| 2,747,695 | Carbon | May 29, 1956 |
| 2,834,437 | Davids | May 13, 1958 |
| 2,880,584 | French | Apr. 7, 1959 |
| 2,960,194 | Stromberg | Nov. 15, 1960 |

FOREIGN PATENTS

| | | |
|---|---|---|
| 101,159 | Australia | June 10, 1937 |
| 1,168,186 | France | Aug. 25, 1958 |
| 758,389 | Great Britain | Oct. 3, 1956 |